G. W. KNAPP.
Sheet-Metal Cup or Can.
No. 197,865. Patented Dec. 4, 1877.
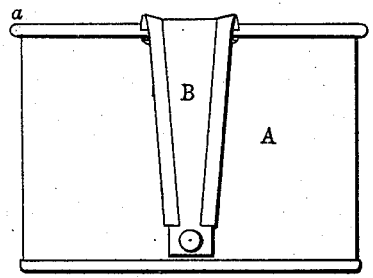
— FIG. I. —
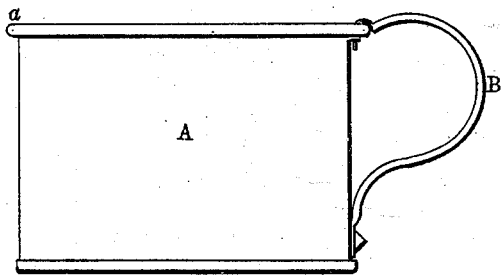
— FIG. II. —
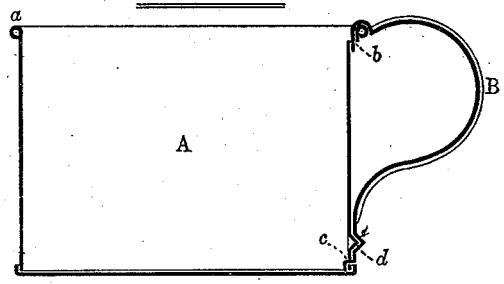
— FIG. III. —
WITNESSES
F. E. Hewlett
D. P. Cowl
INVENTOR
George W. Knapp

UNITED STATES PATENT OFFICE.

GEORGE W. KNAPP, OF BALTIMORE, MARYLAND.

IMPROVEMENT IN SHEET-METAL CUPS OR CANS.

Specification forming part of Letters Patent No. 197,865, dated December 4, 1877; application filed November 7, 1877.

*To all whom it may concern:*

Be it known that I, GEORGE W. KNAPP, of the city of Baltimore and State of Maryland, have invented certain Improvements in Sheet-Metal Cups or Cans, of which the following is a specification; and I do hereby declare that in the same is contained a full, clear, and exact description of my said invention, reference being had to the accompanying drawings, and to the letters of reference marked thereon.

This invention relates to certain improvements in the manner of fastening the handle of a sheet-metal cup or can to the body of the same, as will hereinafter fully appear.

In the description of the invention which follows, reference is made to the accompanying drawings, forming a part of this specification, and in which—

Figures 1 and 2 are exterior side views of a sheet-metal cup illustrating the invention, Fig. 3 being a vertical section of the same.

Similar letters of reference indicate similar parts of the invention in all the views.

A is the body of the cup, having the ordinary beaded edge $a$. The upper part of the handle B is bent over the beaded edge $a$, and the end passed through a slot, $b$, in the body of the can, as shown particularly in Fig. 3 of the drawings.

The part of the handle in contact with the beaded edge is crimped to conform somewhat to its shape, for the purpose of increasing the efficiency of the connection. The lower end of the handle B is also passed through a slot in the cup-body; but in this case the handle is inserted from the exterior of the cup.

With the view of preventing the lower end of the handle being easily withdrawn from the slot $c$, the inner side of the said handle is provided with a depression, $d$, preferably of a conical form, and the exterior of the body of the cup with a correspondingly-shaped projection adapted to fit therein.

By reference to the drawings it will be seen that the upper portion of the body A, between the slots $b$ and $c$, is slightly depressed inwardly, or flattened, to allow the upper end of the handle to pass through the body in a vertical direction. By this means the bending of the said end of the handle, after its insertion in the slot, is avoided.

Handles temporarily fastened, as above described, and with their fastenings completed by the application of solder, are found to resist the action of fire under conditions which would release handles secured by means of solder alone.

Having thus described my invention, what I claim as new, and wish to secure by Letters Patent of the United States, is—

1. The handle of a sheet-metal cup or can, bent so as to clasp the beaded edge of the same, the upper end of said handle being passed through a slot in the body of the cup or can from the interior of the same, substantially as and for the purpose described.

2. The lower end of the handle provided with the depression $d$, combined with the lower part of the body of the can, having a slot to receive the lower extremity of said handle, and a projection to enter the depression $d$, substantially as specified.

3. A sheet-metal cup or can having the upper slot $b$ and the lower slot $c$, and projection corresponding with the depression $d$ in the handle B, as described.

4. A sheet-metal can having the upper portion of the body thereof, between the slots $b$ and $c$, depressed inwardly or flattened, substantially as and for the purpose herein set forth.

5. The handle of a sheet-metal cup or can, provided with a depression in the inner surface thereof, and near to the lower end of the same, adapted to fit over a correspondingly-shaped projection on the outer surface of the cup or can body, substantially as and for the purpose herein described.

6. The outer surface of the body of a sheet-metal cup or can, provided with a projection fitted to enter a correspondingly-shaped depression in the handle of the same, substantially as and for the purpose herein set forth.

In testimony whereof I have hereunto subscribed my name this 27th day of August, in the year of our Lord 1877.

GEORGE W. KNAPP.

Witnesses:
W. W. WHARTON,
WM. T. HOWARD.